O. C. BAUMGART.
DIRECTION INDICATOR FOR AUTOMOBILES.
APPLICATION FILED AUG. 16, 1915.
1,241,904.
Patented Oct. 2, 1917.
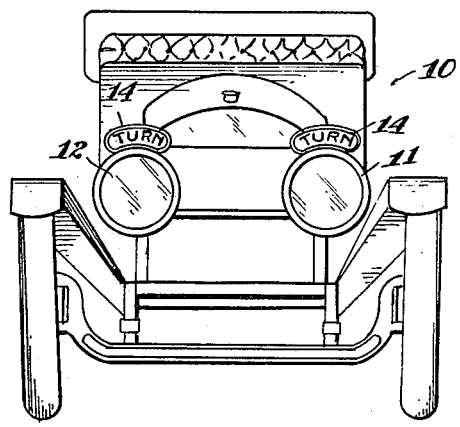
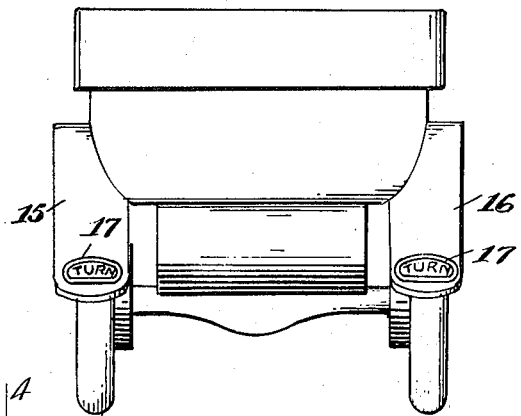
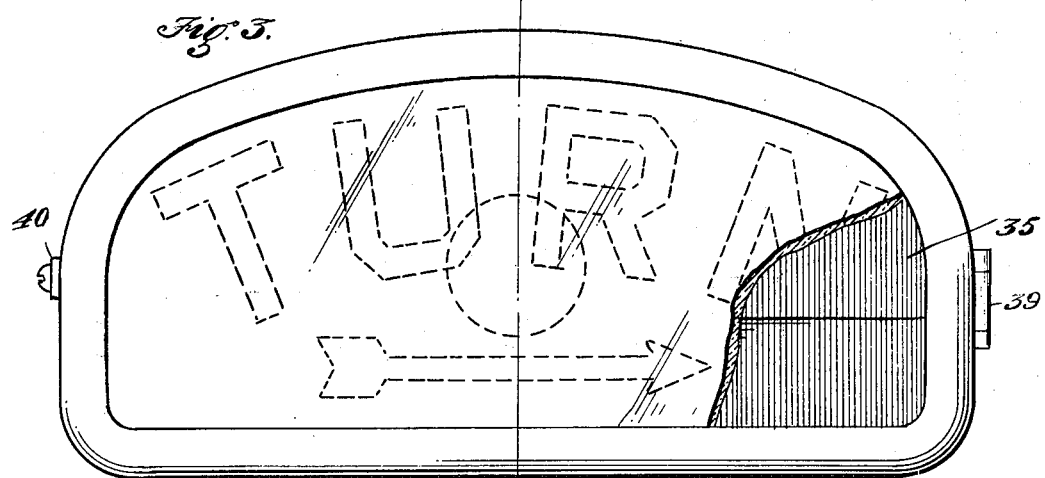
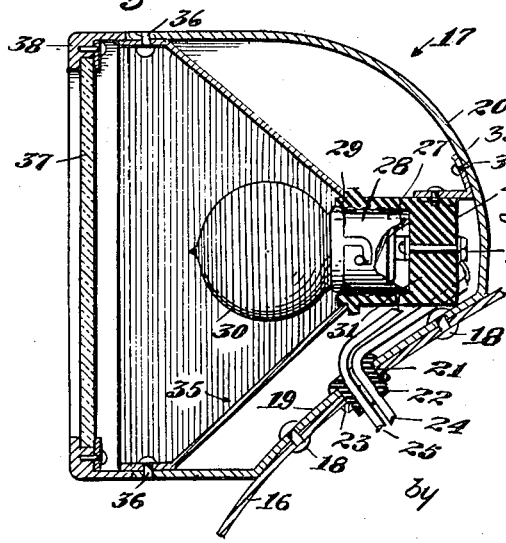
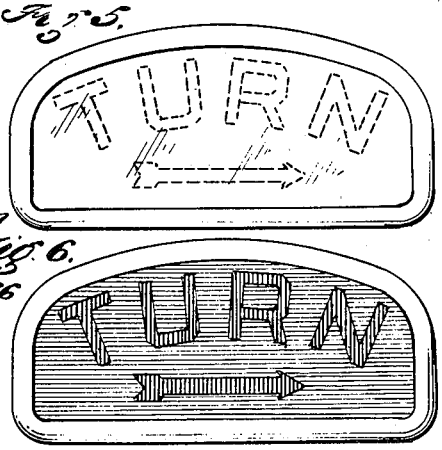
Inventor,
Otto C. Baumgart.
Hazard, Berry and Miller
att'ys.

UNITED STATES PATENT OFFICE.

OTTO C. BAUMGART, OF ATASCADERO, CALIFORNIA, ASSIGNOR OF ONE-HALF TO ORA M. ELLIOTT, OF LOS ANGELES, CALIFORNIA.

DIRECTION-INDICATOR FOR AUTOMOBILES.

1,241,904.    Specification of Letters Patent.    Patented Oct. 2, 1917.

Application filed August 16, 1915. Serial No. 45,734.

*To all whom it may concern:*

Be it known that I, OTTO C. BAUMGART, a citizen of the United States, residing at Atascadero, in the county of San Luis Obispo, and State of California, have invented new and useful Improvements in Direction-Indicators for Automobiles, of which the following is a specification.

It is an object of this invention to provide a direction indicator having an electric signal device which may be positioned on the front lamps or on the mud-guards of an automobile and complementary sets secured to the rear portion of the body of the car or to the rear mud-guards, these indicators being formed with a display screen or field upon which the direction indication may be read by directing a colored light upon the field on the side of the vehicle toward which it is to turn and reinforce the light by placing a reflector of the same color behind the light.

Another object is to provide an illuminating signal device in which vividly colored rays will be projected upon the back of a translucent field on illuminating an electric lamp in such a manner that the colored rays will be substantially and uniformly distributed over the field so as to render normally practically concealed indicia on the field plainly visible from the front thereof, both in the daytime and at night.

The invention primarily resides in providing a translucent screen, preferably formed of ground glass, having an opaque field over a portion of the rear face thereof, disposing a colored lamp globe rearward thereof, and placing a reflector back of the lamp having a color corresponding to that of the globe so as to intensify the color of and distribute the light rays projected from the lamp.

The invention is illustrated in the accompanying drawings in which:

Figure 1 is a front elevation of an automobile showing a pair of my indicator devices secured to the headlights.

Fig. 2 is a rear view of an automobile showing the indicator devices applied to the mud-guards.

Fig. 3 is a view in elevation of the indicator devices with part of the front plate broken away to show the colored reflecting surface which is disposed in the rear of the correspondingly colored lamp globe.

Fig. 4 is a cross section on the line 4—4 of Fig. 3 showing parts in elevation.

Fig. 5 is a view of the indicator as it normally appears when not illuminated.

Fig. 6 is a view the same as Fig. 5 showing the appearance of the indicator when illuminated.

In the application of the invention to an automobile 10, the indicators employed on the front end of the automobile are preferably mounted on the casings of the usual headlights 11 and 12, as indicated at 14 in Fig. 1; a pair of the indicators being provided one on each side of the vehicle. It is manifest, however, that the indicator may be mounted at any other appropriate point on the forward end of the vehicle such as, for instance, on the front mud-guards. A pair of the indicators are mounted on the rear of the vehicle adjacent each side thereof at any suitable point, being here shown as carried by the rear mud-guards 15 and 16, as indicated at 17 of Fig. 2. In mounting the indicator on the mud-guard it is secured thereto by means of rivets or bolts 18, or other suitable fastenings, which connect a wall 19 of the indicator housing 20 with the mud-guard or other support, the wall 19 being shaped to conform to the surface on which the housing 20 is supported. The housing 20 is formed with an opening 21, here shown as disposed in the wall 19 to receive an insulating bushing 22 which is held in place by means of a nut 23; the bushing being shown as passing through the mud-guard 16. A pair of electric supply wires are led through this bushing from any suitable source of electrical supply, such as a storage battery or a magneto operated by the power plant of the vehicle. The conductors 24 and 25 lead to any suitable switching mechanism by which a person in the vehicle may direct the current to the indicators 14 and 17 on one side of the vehicle, or to the indicators 14 and 17 on the opposite side thereof, as desired. The terminal of the conductor 24 leading into the housing 20 connects with the contact screw 26, passing through an insulating member 27 mounted on the rear wall of the housing 20. The screw 26 connects with a spring contact member 28 which is spaced from the inner wall of a metallic socket 29 carried by the insulating member 27 and insulated from the contact 28. Socket 29 is formed with the usual bayonet slot and is adapted to receive the stud formed on the plug of the electric light globe 30, as is common in electric headlight and lamp construction. The conductor 25 connects with the socket 29 as indicated at 31, so as to direct the electric current through the filament of the electric lamp, one terminal of which connects with the socket 29 to the outer wall of the lamp plug, the other terminal of which connects with the spring contact member 28. The insulating member 27 is secured to the bracket 33 which is attached to the housing 20 by means of a rivet 34, or other suitable fastening.

Mounted in the housing 20 is a reflector 35 comprising upper, lower and end walls, which upper and lower walls diverge outwardly at an angle of substantially 90° and are secured at their outer edges to the walls of the housing 20 by means of rivets 36, in such position that the upper and lower walls of the reflector rest at an angle of substantially 45° to the horizontal. The lamp 30 rests within the reflector so that the vertical rays of light from the lamp upon striking the upper and lower walls of the reflector will be reflected outwardly horizontally through the screen 37.

In carrying out the present invention, it is essential that the reflective or inner surface of the upper, lower and end walls of the reflector 35 be of a color substantially corresponding to that of the lamp globe 30, which is preferably red. Extending across the open end of the housing 20 in front of the reflector 35 and the lamp globe 30, is a screen 37 of a translucent character, being preferably formed of ground glass through which objects are not discernible, but which will permit the passage of light rays therethrough. This translucent screen is preferably white so as to be in marked contrast with the color of the globe 30 and the reflector 35. The screen 37 is mounted upon a frame 38 which is hingedly connected to the housing 20 by means of a hinge 39, and is adapted to be clamped against displacement by means of a screw 40 or other suitable fastenings. Arranged on the rear surface of the screen 37 is an opaque field having cut-away or blank portions in the form of suitable indicia or characters, the blanks being here shown as consisting of the word "Turn" with an arrow arranged thereneath. The opaque field may be formed by coating the rear face of the screen with a suitable substance which will render the coated portion opaque to prevent the passage of light therethrough and leaving an uncovered portion of the translucent screen through which the light rays may be projected. It is evident, however, that other means may be employed to make a portion of the translucent surface opaque, such as by placing a stencil form of opaque material such as metal or paper over the face of the translucent screen. The translucent screen is of such density that the cut-away portions or inscription on the back thereof is not plainly visible from the front, particularly as the space rearward of the screen is housed in and darkened by the reflector. However, on illuminating the electric lamp the color rays emitted therefrom and reflected by the colored reflector 35 will be directed through the uncovered portions of the field and projected through the translucent screen in such a manner as to render the cut-away portions plainly visible on the face of the screen. It has been found in practice that by placing a colored lamp rearward of the screen without the colored reflector, a pale colored light will be projected upon the screen which is not of sufficient intensity to be readily distinguished. This is caused by the mixture of white or yellow light rays with the colored rays passing through the globe before such rays strike the screen. By placing a reflector 35 of a color corresponding to that of the globe, the white light rays are practically utilized rearward of the screen so that the rays from the globe 30 will be intensified in color, thereby rendering the cut-away or translucent portions of the field plainly visible from the front thereof, either in daytime or at night. In the operation of the invention, when the driver of the vehicle intends to turn to the right, he will operate a switch (not shown) which will illuminate the indicators positioned on the right-hand side of the vehicle at its forward and rear ends, the switch being cut off after the turn is made, and a similar operation is performed when it is desired to turn to the left. The exposed white field of the screen having no visible characters thereon does not confuse observers, but when the lamp is illuminated and the bright red characters are flashed on the screen, attention of the observer is immediately directed thereto so that he may readily determine the direction the vehicle is to turn.

What I claim is:

1. A direction indicator for vehicles, comprising an opaque screen provided with translucent direction-indicating indicia normally invisible in front of said screen, a lamp globe arranged rearward of said screen and formed of a color contrasting with that of the screen, a reflective surface of a color substantially corresponding to that of said lamp globe for intensifying the color rays issuing from said globe and directing the same through the said translucent indicia of said screen, and illuminating means mounted within said globe, whereby said indicia are rendered plainly visible in front of said screen.

2. A direction indicator for vehicles, comprising a ground glass screen, an opaque field on the rear thereof provided with cutaway portions constituting direction-indicating indicia normally invisible in front of said screen, a housing inclosing the rear of the screen, a red-colored reflector within said housing, a red-colored lamp globe interposed in the housing between the screen and the reflector, and illuminating means mounted within said globe, whereby said indicia are rendered plainly visible in front of said screen.

3. A direction indicator for vehicles, comprising an opaque screen having translucent direction-indicating indicia normally visible in front of said screen, a housing inclosing the rear of said screen, a reflector in said housing having outwardly diverging upper and lower walls arranged at an angle of substantially 45° to the horizontal, and a lamp mounted within said reflector, the color of the globe of said lamp and said reflector being substantially alike and contrasting with the color of said screen, whereby said indicia are rendered plainly visible in front of said screen.

In testimony whereof I have signed my name to this specification.

OTTO C. BAUMGART.